United States Patent
Kojima et al.

(10) Patent No.: US 9,590,237 B2
(45) Date of Patent: Mar. 7, 2017

(54) LITHIUM-ION SECONDARY BATTERY AND METHOD FOR PRODUCING THE SAME

(71) Applicants: KABUSHIKI KAISHA TOYOTA JIDOSHOKKI, Kariya-shi, Aichi (JP); NATIONAL INSTITUTE OF ADVANCED INDUSTRIAL SCIENCE AND TECHNOLOGY, Tokyo (JP)

(72) Inventors: Akira Kojima, Kariya (JP); Junichi Niwa, Kariya (JP); Kazuhito Kawasumi, Kariya (JP); Yuta Ikeuchi, Ikeda (JP); Masanori Morishita, Ikeda (JP); Toshikatsu Kojima, Ikeda (JP); Tetsuo Sakai, Ikeda (JP)

(73) Assignees: KABUSHIKI KAISHA TOYOTA JIDOSHOKKI, Aichi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/769,750

(22) PCT Filed: Jan. 8, 2014

(86) PCT No.: PCT/JP2014/000036
§ 371 (c)(1),
(2) Date: Aug. 21, 2015

(87) PCT Pub. No.: WO2014/129096
PCT Pub. Date: Aug. 28, 2014

(65) Prior Publication Data
US 2015/0380729 A1    Dec. 31, 2015

(30) Foreign Application Priority Data

Feb. 25, 2013 (JP) .................................. 2013-034842

(51) Int. Cl.
*H01M 2/16* (2006.01)
*H01M 4/36* (2006.01)
(Continued)

(52) U.S. Cl.
CPC .......... *H01M 4/364* (2013.01); *H01M 4/136* (2013.01); *H01M 4/1395* (2013.01);
(Continued)

(58) Field of Classification Search
CPC ....... H01M 10/0525; H01M 2004/021; H01M 2004/028; H01M 2220/30; H01M 4/136;
(Continued)

(56) References Cited

U.S. PATENT DOCUMENTS

| 2010/0233543 A1 | 9/2010 | Numata et al. |
| 2011/0291055 A1 | 12/2011 | Kojima et al. |
| 2012/0208087 A1* | 8/2012 | Yamamoto ............ H01M 4/485 429/223 |

FOREIGN PATENT DOCUMENTS

| CN | 101501920 A | 8/2009 |
| CN | 102300811 A | 12/2011 |

(Continued)

OTHER PUBLICATIONS

International Search Report of PCT/JP2014/000036 dated Apr. 8, 2014 [PCT/ISA/210].
(Continued)

*Primary Examiner* — Patrick Ryan
*Assistant Examiner* — Ben Lewis
(74) *Attorney, Agent, or Firm* — Sughrue Mion, PLLC

(57) ABSTRACT

A lithium-ion secondary battery of the present invention comprises a positive electrode including a positive electrode active material composite formed by compositing a lithium silicate-based material and a carbon material, a negative electrode including a negative electrode active material
(Continued)

containing a silicon, and an electrolyte. The lithium-ion secondary battery satisfies 0.8<B/A<1.2, where A is irreversible capacity of the positive electrode and B is irreversible capacity of the negative electrode.

11 Claims, 9 Drawing Sheets

(51) Int. Cl.
*H01M 4/136* (2010.01)
*H01M 4/1395* (2010.01)
*H01M 4/38* (2006.01)
*H01M 4/58* (2010.01)
*H01M 10/0525* (2010.01)
*H01M 4/485* (2010.01)
*H01M 4/587* (2010.01)
*H01M 4/02* (2006.01)

(52) U.S. Cl.
CPC .......... *H01M 4/386* (2013.01); *H01M 4/485* (2013.01); *H01M 4/587* (2013.01); *H01M 4/5825* (2013.01); *H01M 10/0525* (2013.01); H01M 2004/021 (2013.01); H01M 2004/028 (2013.01); H01M 2220/30 (2013.01); Y02E 60/122 (2013.01)

(58) Field of Classification Search
CPC .... H01M 4/1395; H01M 4/364; H01M 4/386; H01M 4/485; H01M 4/5825; H01M 4/587; Y02E 60/122
See application file for complete search history.

(56) References Cited

FOREIGN PATENT DOCUMENTS

| | | |
|---|---|---|
| JP | 10-294104 A | 11/1998 |
| JP | 2000-173586 A | 6/2000 |
| JP | 2011-113863 A | 6/2011 |
| JP | 2011-228052 A | 11/2011 |
| JP | 2013-197052 A | 9/2013 |
| WO | 2012/124244 A1 | 9/2012 |
| WO | 2013/099280 A1 | 7/2013 |

OTHER PUBLICATIONS

Communication dated Oct. 9, 2016 from the State Intellectual Property Office of the P.R.C. in counterpart Application No. 201480009445.4.

* cited by examiner

Fig. 4    Li$_2$FeSiO$_4$ (Sample 1)
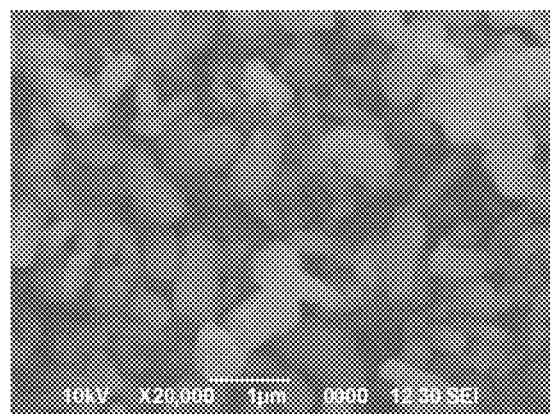
Fig. 5    Manual Stirring, 0.5h (Sample 2)
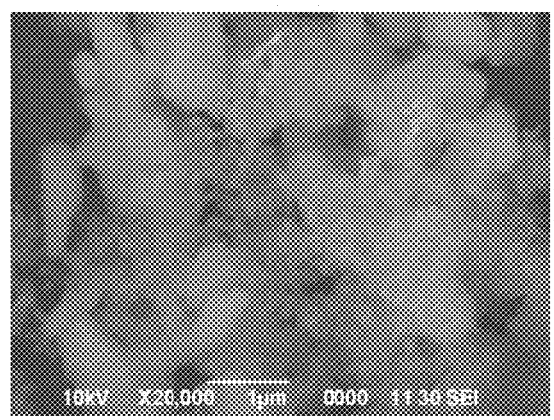
Fig. 6    200 rpm, 5h (Sample 3)
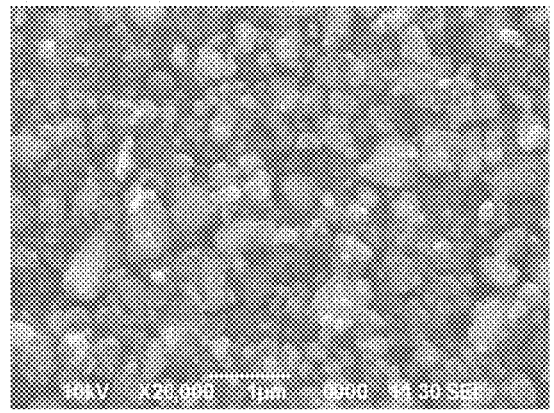

Fig. 7    450 rpm, 5h (Sample 4)
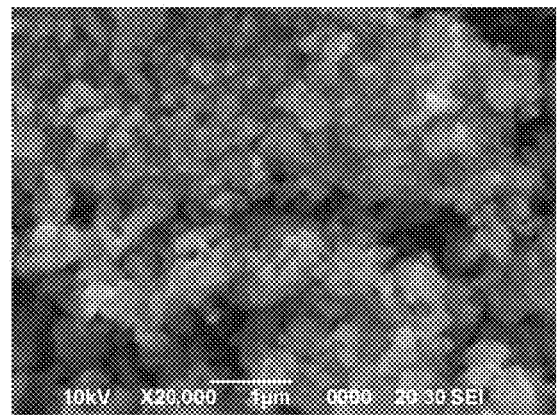
Fig. 8    700 rpm, 5h (Sample 5)
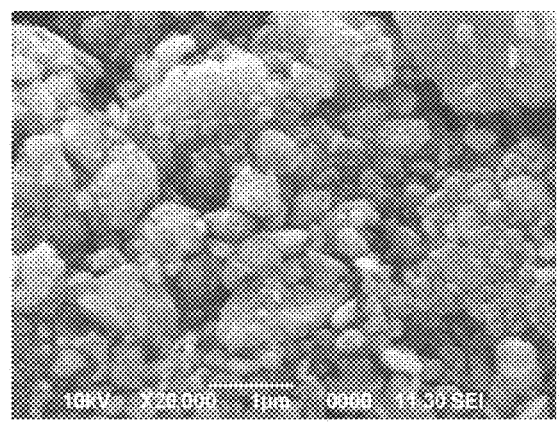
Fig. 9    800 rpm, 5h (Sample 6)
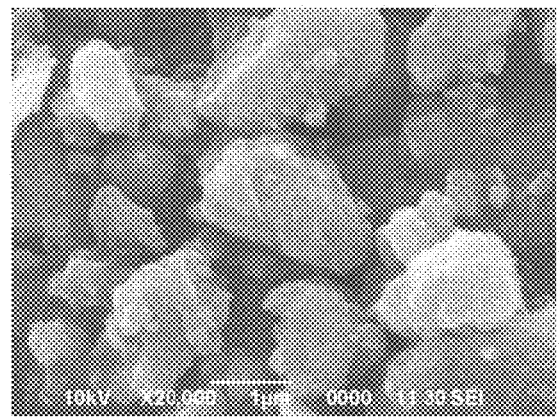

Fig. 10
450 rpm, 5h (Sample 4)
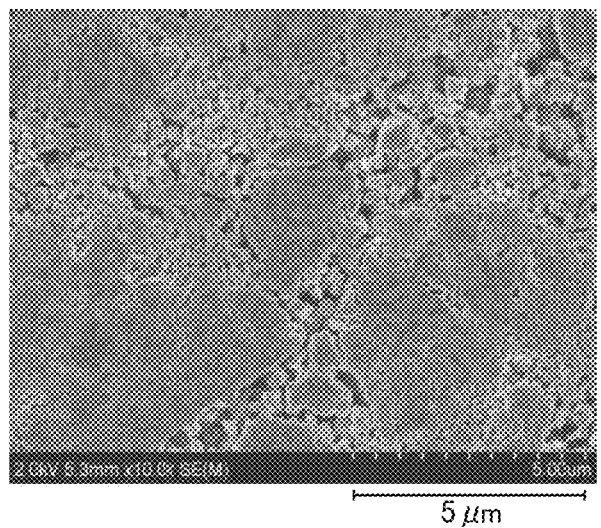
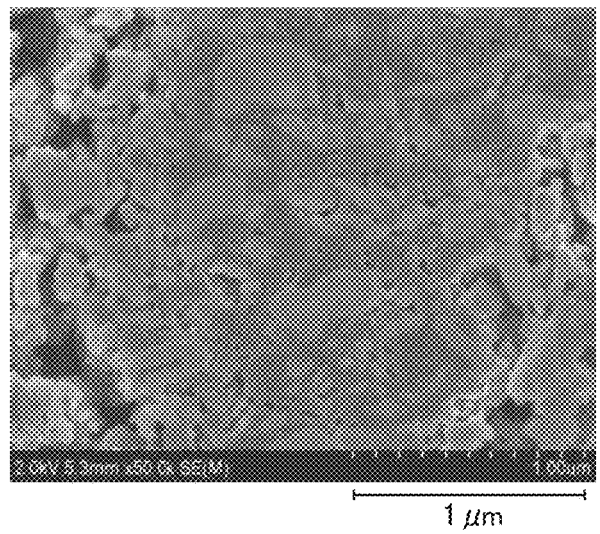

Fig. 11
800 rpm, 5h (Sample 6)
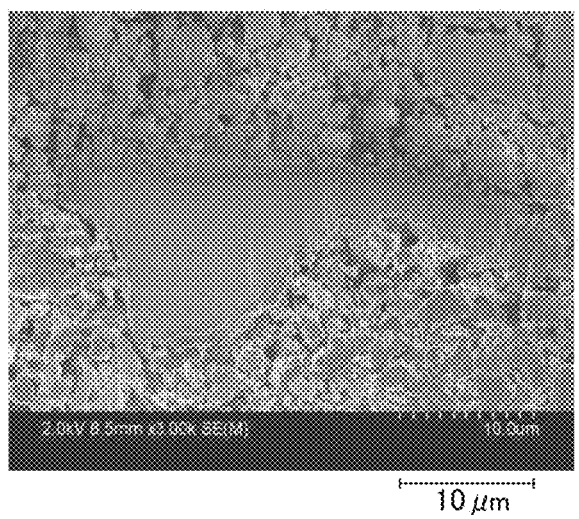
10 μm
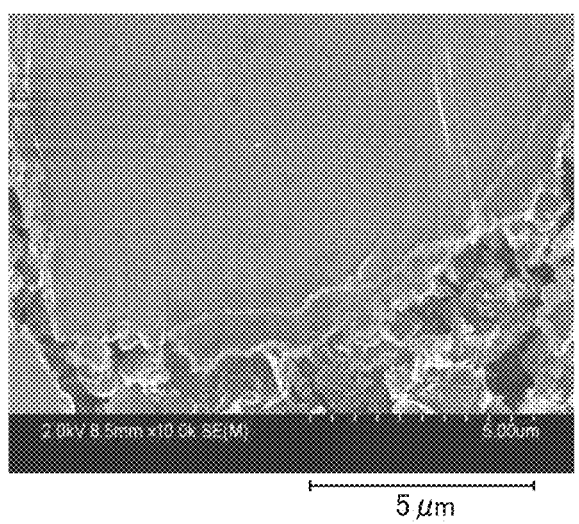
5 μm
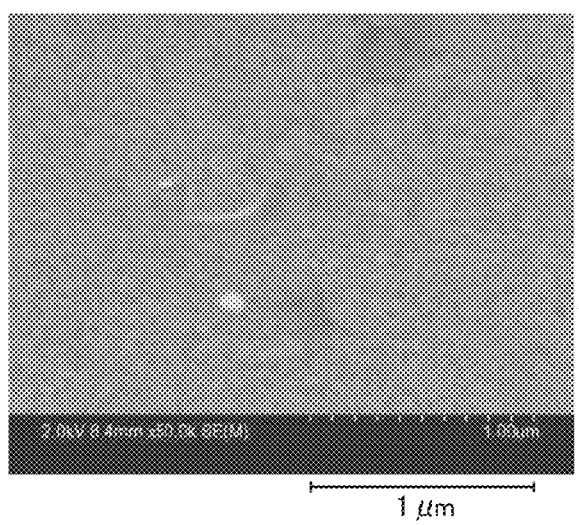
1 μm

US 9,590,237 B2

LITHIUM-ION SECONDARY BATTERY AND METHOD FOR PRODUCING THE SAME

CROSS REFERENCE TO RELATED APPLICATIONS

This application is a National Stage of International Application No. PCT/JP2014/000036, filed Jan. 8, 2014, claiming priority based on Japanese Patent Application No. 2013-034842, filed Feb. 25, 2013, the contents of all of which are incorporated herein by reference in their entirety.

TECHNICAL FIELD

The present invention relates to a lithium-ion secondary battery having an improved battery capacity, and a method for producing the same.

BACKGROUND ART

Lithium-ion secondary batteries are widely used as power sources of portable electronic devices. In such a lithium-ion secondary battery, a composite oxide such as $LiCoO_2$ and $LiMn_2O_4$ is mainly used as a positive electrode active material, and a graphite-based material is used as a negative electrode active material. Since both these materials have small irreversible capacity, the battery can provide battery capacity without a great decrease from positive electrode capacity or negative electrode capacity.

In recent years, a silicate material $Li_2MSiO_4$ (M=at least one selected from the group consisting of Fe, Mn, and Co) has attracted attention as a positive electrode active material in view of high safety and the amount of resources. However, unfortunately, the silicate material has a larger irreversible capacity than conventional composite oxides such as $LiCoO_2$ and $LiMn_2O_4$. Therefore, when a battery comprises a positive electrode using a silicate material having a large irreversible capacity as a positive electrode active material and a negative electrode using a graphite-based material having a small irreversible capacity as a negative electrode active material, disadvantageously, actual capacity of the negative electrode decreases.

On the other hand, research and development have been conducted on tin-based materials and silicon-based materials having larger capacity than the graphite materials as negative electrode active materials. Unfortunately, the tin-based materials and the silicon-based materials have large irreversible capacity. Therefore, when a battery comprises a positive electrode using one of the abovementioned composite oxides having a small irreversible capacity as a positive electrode active material, and a negative electrode using one of the abovementioned tin-based materials and the silicon-based materials having a large irreversible capacity as a negative electrode active material, unfortunately, actual capacity of the positive electrode decreases. In order to improve this problem, it is possible to predope lithium on the one of the tin-based materials and the silicon-based materials and thereby reduce the irreversible capacity. However, this is disadvantageous in battery mass production due to an addition of the predoping step.

Moreover, Japanese Unexamined Patent Application Publication No. 2000-173,586 has proposed to make most of reversible capacities of a positive electrode and a negative electrode and enable battery capacity enhancement by adding, to the negative electrode, a metal compound to be electrochemically reduced to a metal upon electric charge. However, this is not suitable for battery mass production because of addition of a step of adding the metal compound to the negative electrode.

Japanese Unexamined Patent Application Publication No. 2011-228,052 is based on a finding that cations other than Li ions move from a positive electrode active material $Li_2MnO_3$ to a negative electrode by initial electric charge, and has proposed to reduce battery weight and size without decreasing battery capacity by setting actual capacity of the negative electrode to be smaller than actual capacity of a positive electrode by decreasing the amount of a negative electrode active material from a conventional amount.

CITATION LIST

Patent Literature

[PTL 1] Japanese Unexamined Patent Application Publication No. 2000-173,586
[PTL 2] Japanese Unexamined Patent Application Publication No. 2011-228,052

SUMMARY OF INVENTION

Technical Problem

The present inventors have developed a lithium-ion secondary battery enabling effective use of actual battery capacity by a different technique from those of Japanese Unexamined Patent Application Publication No. 2000-173,586 and Japanese Unexamined Patent Application Publication No. 2011-228,052.

The present invention has been made in view of these circumstances. It is an object of the present invention to provide a lithium-ion secondary battery enabling effective use of actual battery capacity.

Solution to Problem

A lithium-ion secondary battery of the present invention is a lithium-ion secondary battery, comprising a positive electrode including a positive electrode active material composite formed by compositing a lithium silicate-based material and a carbon material, a negative electrode including a negative electrode active material containing a silicon, and an electrolyte, and satisfying $0.8<B/A<1.2$, where A is irreversible capacity of the positive electrode and B is irreversible capacity of the negative electrode.

A method for producing a lithium-ion secondary battery of the present invention is a method for producing a lithium-ion secondary battery having a positive electrode including a positive electrode active material composite formed of compositing a lithium silicate-based material and a carbon material, a negative electrode including a negative electrode active material containing a silicon, and an electrolyte; forming the positive electrode active material composite by compositing the lithium silicate-based material and the carbon material by mechanical milling of the lithium silicate-based material and the carbon material; and satisfying $0.8<B/A<1.2$, where A is irreversible capacity of the positive electrode and B is irreversible capacity of the negative electrode.

Advantageous Effects of Invention

According to the present invention, the formula $0.8<B/A<1.2$ is satisfied, where A is irreversible capacity of a positive electrode and B is irreversible capacity of a negative electrode. Therefore, actual battery capacity can be effectively used.

BRIEF DESCRIPTION OF DRAWINGS

FIG. 4 shows a SEM image of Sample 1.
FIG. 5 shows a SEM image of Sample 2.
FIG. 6 shows a SEM image of Sample 3.
FIG. 7 shows a SEM image of Sample 4.
FIG. 8 shows a SEM image of Sample 5.
FIG. 9 shows a SEM image of Sample 6.

FIG. 10 show SEM images of a cross section of Sample 4. Scale bars in an upper image and a lower image of FIG. 10 represent 5 μm and 1 μm, respectively.

FIG. 11 show SEM images of a cross section of Sample 6. Scale bars in an upper image, a middle image and a lower image of FIG. 11 represent 10 μm, 5 μm, and 1 μm, respectively.

DESCRIPTION OF EMBODIMENTS

A lithium-ion secondary battery of an embodiment of the present invention will be described in detail.

In the lithium-ion secondary battery, a positive electrode includes a positive electrode active material composite formed by compositing a lithium silicate-based material and a carbon material, and a negative electrode includes a negative electrode active material containing a silicon.

As a result of earnest researches, the present inventors have found that irreversible capacity can be adjusted in a step of forming a positive electrode active material composite by compositing a lithium silicate-based material and a carbon material. A ratio of irreversible capacity to reversible capacity of a positive electrode is changed by controlling the step of compositing the lithium silicate-based material and the carbon material. By this change, a difference between the irreversible capacity of the positive electrode and irreversible capacity of a negative electrode is decreased, i.e., irreversible capacity A of the positive electrode and irreversible capacity B of the negative electrode are brought close to each other, thereby satisfying $0.8<B/A<1.2$.

Here, capacity of each of the positive electrode and the negative electrode is divided into irreversible capacity and reversible capacity. In the description of the present invention, irreversible capacity means part of charge capacity of each of the electrodes which cannot be discharged, and corresponds to a difference between initial charge capacity and initial discharge capacity of each of the electrodes. Reversible capacity means part of charge capacity of each of the electrodes which can be discharged, and corresponds to initial discharge capacity of each of the electrodes. A sum of reversible capacity and irreversible capacity corresponds to initial charge capacity. Initial charge capacity, reversible capacity and irreversible capacity of each of the positive electrode and the negative electrode are capacities detected when a half cell is assembled by using the positive electrode or the negative electrode of the present invention as a single electrode.

Actual capacity means initial discharge capacity which can be actually used when a secondary battery of the present invention having a positive electrode and a negative electrode is assembled. "Initial" means time when voltage is applied for the first time to a positive electrode or a negative electrode to which voltage has never been applied.

Irreversible capacity of a positive electrode is generated because, when Li ions are released from a positive electrode active material in initial charge, the released Li ions are not stored by the positive electrode active material in next discharge. Irreversible capacity of a negative electrode is generated because Li ions stored by a negative electrode active material in initial charge are not released in next discharge.

Figure 1:
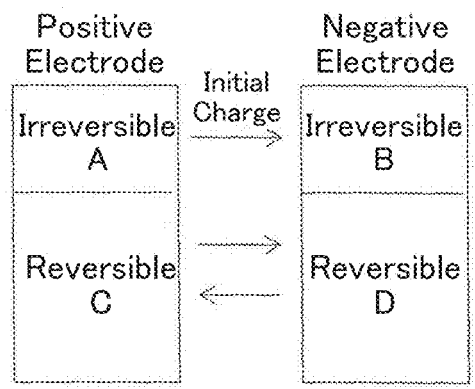
FIG. 1 is an explanatory view illustrating a relation between a positive electrode and a negative electrode when irreversible capacity of the positive electrode and that of the negative electrode are close to each other.

FIG. 1 is an explanatory view illustrating a relation between a positive electrode and a negative electrode when irreversible capacity of the positive electrode and that of the negative electrode are close to each other. As shown in FIG. 1, irreversible capacity A of the positive electrode and irreversible capacity B of the negative electrode are brought close to each other and satisfy $0.8<B/A<1.2$. Therefore, the irreversible capacities of both the electrodes are offset by each other. That is to say, most of the irreversible capacity part of the Li ions released from the positive electrode in initial charge are stored by irreversible capacity part of the negative electrode. The irreversible capacity of the negative electrode is filled with that of the positive electrode without excess or deficiency in initial charge. Therefore, reversible capacities of both the electrodes can be effectively used. There is no need to predope Li on the negative electrode.

In addition, preferably, a relation between A and B satisfies $1.0<B/A<1.2$. In this case, the irreversible capacity A of the positive electrode and the irreversible capacity B of the negative electrode are brought still closer to each other and reversible capacities of both the electrodes can be effectively used.

Figure 2:
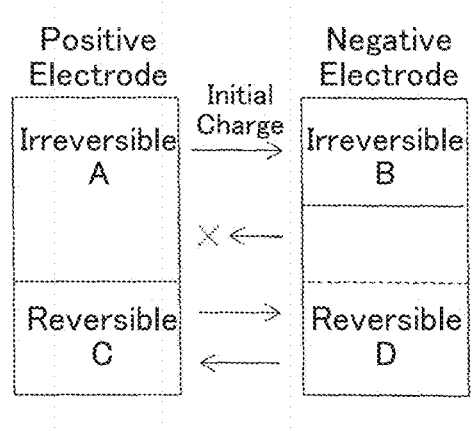
FIG. 2 is an explanatory view illustrating a relation between a positive electrode and a negative electrode when irreversible capacity of the positive electrode is larger than that of the negative electrode.

FIG. 2 is an explanatory view illustrating a relation between a positive electrode and a negative electrode when irreversible capacity of the positive electrode is larger than that of the negative electrode. As shown in FIG. 2, B/A is set to be 0.8 or less by causing irreversible capacity of the positive electrode to be larger than that of the negative electrode. In this case, the irreversible capacity A of the positive electrode is larger than the irreversible capacity B of the negative electrode. A difference between the irreversible capacity of the positive electrode and the irreversible capacity of the negative electrode (A–B) is not used in reversible capacity of the negative electrode. Therefore, actual capacity of the negative electrode is smaller than the reversible capacity of the negative electrode.

Figure 3:
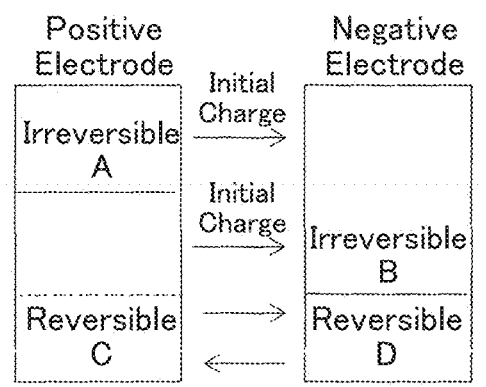
FIG. 3 is an explanatory view illustrating a relation between a positive electrode and a negative electrode when irreversible capacity of the positive electrode is smaller than that of the negative electrode.
Figure 12:
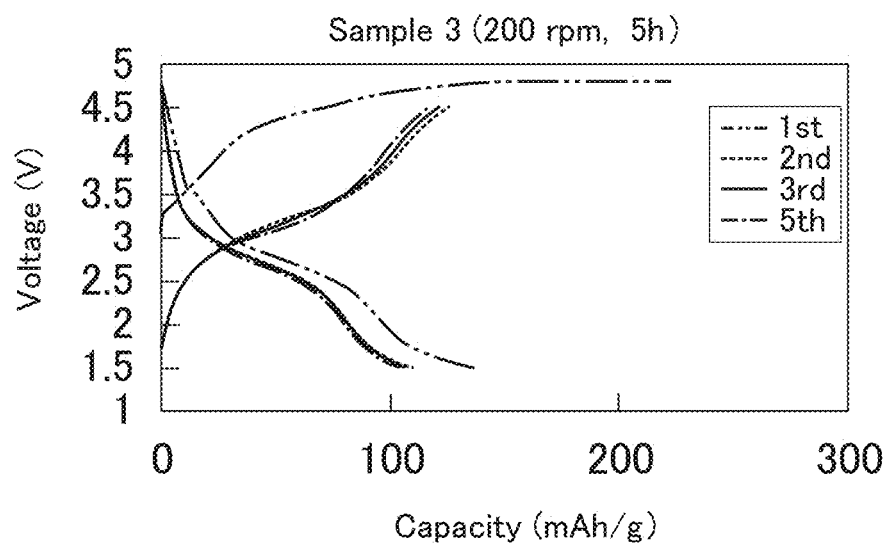
FIG. 12 is a graph showing charge and discharge curves of a half cell produced by using a positive electrode active material of Sample 3.
Figure 13:
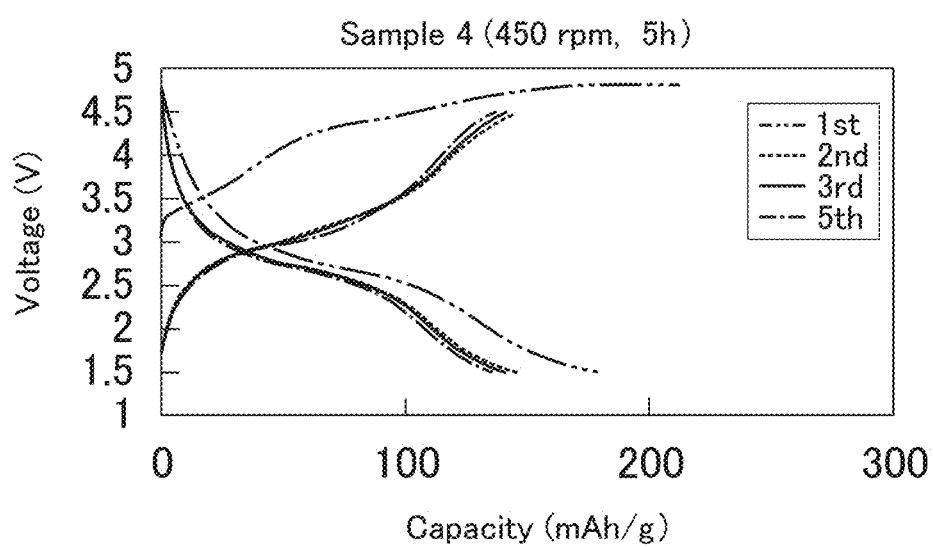
FIG. 13 is a graph showing charge and discharge curves of a half cell produced by using a positive electrode active material of Sample 4.
Figure 14:
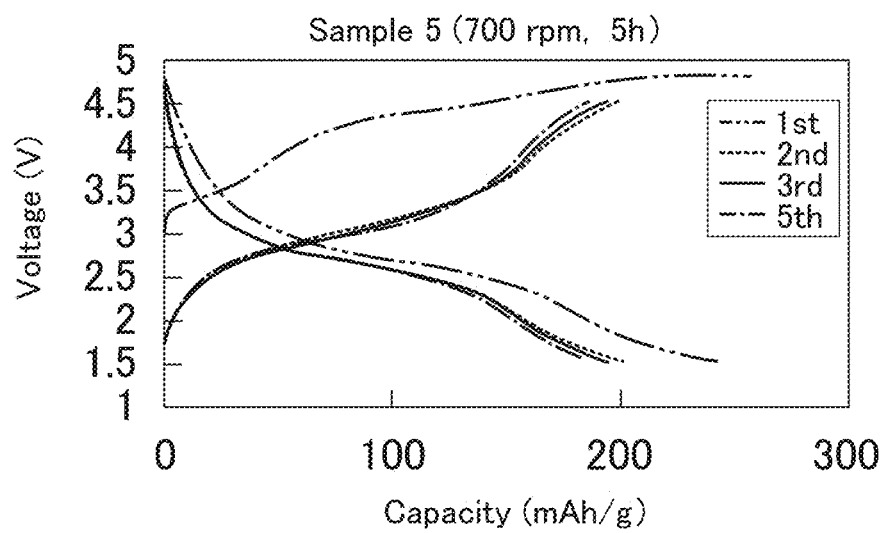
FIG. 14 is a graph showing charge and discharge curves of a half cell produced by using a positive electrode active material of Sample 5.
Figure 15:
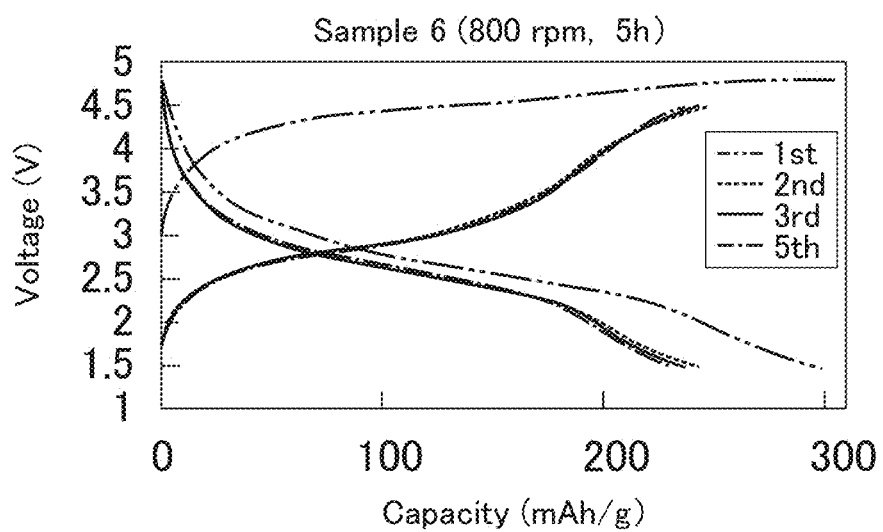
FIG. 15 is a graph showing charge and discharge curves of a half cell produced by using a positive electrode active material of Sample 6.
Figure 16:
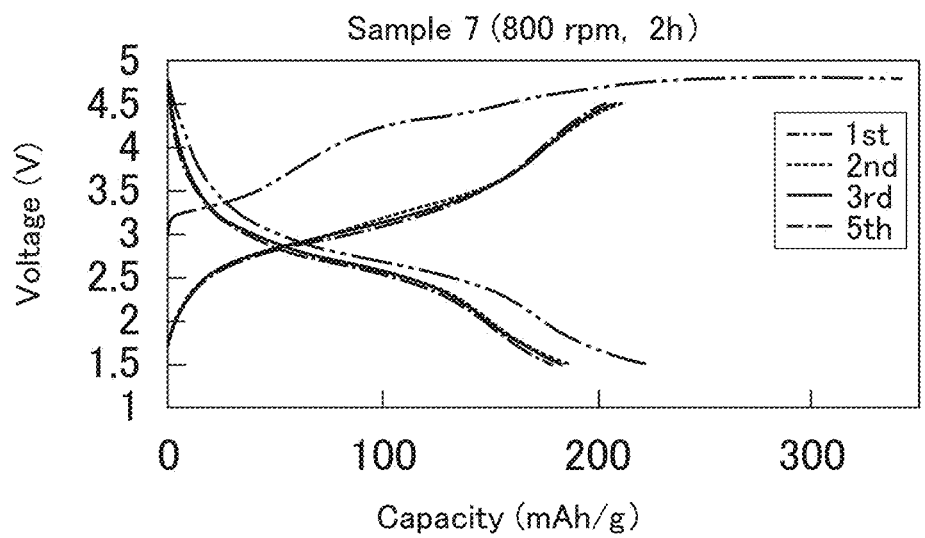
FIG. 16 is a graph showing charge and discharge curves of a half cell produced by using a positive electrode active material of Sample 7.

FIG. 3 is an explanatory view illustrating a relation between a positive electrode and a negative electrode when irreversible capacity of the positive electrode is smaller than that of the negative electrode. As shown in FIG. 3, B/A is set to be 1.2 or more by causing irreversible capacity of the positive electrode to be smaller than that of the negative electrode. In this case, the irreversible capacity A of the positive electrode is smaller than the irreversible capacity B of the negative electrode. A difference between the irreversible capacity of the negative electrode and the irreversible capacity of the positive electrode (B–A) is not used in reversible capacity of the positive electrode. Therefore, actual capacity of the positive electrode is smaller than the reversible capacity of the positive electrode.

Preferably, $0.8<D/C<1.2$ is satisfied, where C is reversible capacity of the positive electrode and D is reversible capacity of the negative electrode. More preferably, $1.0<D/C<1.1$ is satisfied. In this case, the reversible capacity C of the positive electrode and the reversible capacity D of the negative electrode are close to each other. The reversible capacity of the positive electrode and the reversible capacity of the negative electrode contribute to reactions of storing and releasing Li ions without excess or deficiency with respect to each other. Therefore, reversible capacities of both the electrodes can be effectively used.

On the other hand, when D/C is 0.8 or less, the reversible capacity C of the positive electrode is excessively smaller than the reversible capacity D of the negative electrode.

On the other hand, when D/C is 1.2 or more, the reversible capacity C of the positive electrode is excessively smaller than the reversible capacity D of the negative electrode.

(1) Composition of Positive electrode Active Material and Adjustment of Irreversible Capacity A positive electrode includes a positive electrode active material. The positive electrode active material comprises a positive electrode active material composite formed by compositing a lithium silicate-based material and a carbon material. Preferably, the positive electrode active material composite is formed by compositing the lithium silicate-based material and the carbon material by mechanical milling of the lithium silicate-based material and the carbon material.

In the present invention, preferably, irreversible capacity of a positive electrode active material composite is mainly controlled in order to bring irreversible capacity of the positive electrode and irreversible capacity of the negative electrode close to each other. The irreversible capacity of the positive electrode active material composite can be adjusted, for example, by controlling energy to be given to the lithium silicate-based material and the carbon material in making the composite. Irreversible capacity of the positive electrode decreases with an increase in energy to be given, and the irreversible capacity of the positive electrode increases with a decrease in energy.

Preferably, the positive electrode active material composite material composite is formed by compositing the lithium silicate-based material and the carbon material by mechanical milling of the lithium silicate-based material and the carbon material, and $0.8<B/A<1.2$ is satisfied, where A is irreversible capacity of the positive electrode, and B is irreversible capacity of the negative electrode.

Specifically, preferably, irreversible capacity of the positive electrode is adjusted by controlling at least one of milling speed and milling time of the mechanical milling. Besides, irreversible capacity of the positive electrode active material composite can be adjusted, for example, by changing milling temperature of the mechanical milling and/or a mixing ratio of the carbon material.

For example, irreversible capacity of the positive electrode decreases with an increase in milling speed of the mechanical milling, and the irreversible capacity of the positive electrode increases with a decrease in milling speed of the mechanical milling. Irreversible capacity of the positive electrode decreases with a longer milling time of the mechanical milling and the irreversible capacity of the positive electrode increases with a shorter milling time of the mechanical milling.

The reason why the irreversible capacity of the positive electrode can be adjusted by controlling the amount of energy to be given to the lithium silicate-based material and the carbon material in making the composite is supposed to be as follows. Crystal structure of the lithium silicate-based material hardly changes between before and after energy is given, but ion distribution in the crystal structure changes. Specifically speaking, when the energy is small, corresponding elements are respectively located in sites of the crystal structure, so the respective sites exhibit their own originality.

On the other hand, when the energy is great, Li and a transitional metal element are intermingled with each other in Li sites and transitional metal element sites. Therefore, Li ions are readily stored and released. Upon applying voltage to the positive electrode in this state, Li ions are easy to be stored and released, so reversible capacity of the positive electrode increases and irreversible capacity of the positive electrode decreases.

In order to adjust irreversible capacity and reversible capacity of the positive electrode by controlling the above-mentioned irreversible capacity of the positive electrode active material composite, preferably the amount of the positive electrode active material composite applied to a positive electrode current collector and the amount of the negative electrode active material to a negative electrode current collector are set to predetermined amounts. This is because a change in the amount of the positive electrode active material applied to the positive electrode current collector or a change in the amount of the negative electrode active material applied to the negative electrode current collector may cause a change in irreversible capacity and reversible capacity of the positive electrode.

The positive electrode active material composite is formed by compositing a lithium silicate-based material and a carbon material. The lithium silicate-based material mainly serves as an active material. The carbon material serves as an electrically conductive material and enhances electric conduction in the silicate-based material. Upon compositing these two materials, charge and discharge characteristics of the positive electrode active material composite can be enhanced.

Preferably, the lithium silicate-based material is expressed by a compositional formula $Li_{2+a-b}A_bM_{1-\beta}M'_\beta Si_{1+\alpha}O_{4+c}$, where A is at least one element selected from the group consisting of Na, K, Rb, and Cs, M is at least one element selected from the group consisting of Fe and Mn, and M' is at least one element selected from the group consisting of Mg, Ca, Co, Al, Ni, Nb, Ti, Cr, Cu, Zn, Zr, V, Mo and W, and the subscripts are as follows: $0 \leq \alpha \leq 0.2$, $0 \leq \beta \leq 0.5$, $0 \leq a < 1$, $0 \leq b < 0.2$, $0 < c < 0.3$. The abovementioned compositional formula expresses a basic composition of the lithium silicate-based material. Part of Li, A, M, M', Si and/or O in the above compositional formula can be replaced with another element. Preferably, the replacement with another element is performed as long as it has little adverse effect on capacity. Examples of the lithium silicate-based material of the present invention include lithium silicate-based materials having composition which slightly deviates from the abovementioned compositional formula due to inevitable loss of Li, A, M, M', Si or O or oxidation of the chemical compound.

Examples of the lithium silicate-based material include $Li_2FeSiO_4$, $Li_2MnSiO_4$, $Li_2CoSiO_4$, and $Li_2NiSiO_4$.

Preferably, the carbon material has electric conductivity. Examples of the carbon material include acetylene black (AB), Ketjenblack (KB, registered mark), carbon black, carbon nanotubes, graphene, carbon fiber, and graphite. Among these examples, acetylene black (AB), Ketjenblack (KB), and carbon black are especially preferred.

A mass percent ratio of the carbon material is preferably not less than 1% by mass and not more than 50% by mass, and more preferably, not less than 5% by mass and not more than 30% by mass, when the total mass of the positive electrode active material composite is set to 100% by mass. In this case, the lithium silicate-based material and the carbon material are uniformly dispersed and a large amount of electric capacity can be used.

Preferably, the lithium silicate-based material before being applied with energy has an average particle size of, for example, not less than 200 nm and not more than 5 μm, and the carbon material before being applied with energy has an average particle size of, for example, not less than 100 nm and not more than 5 μm. In this case, upon being applied with mechanical energy, the lithium silicate-based material and the carbon material are composited, thereby easily obtaining a positive electrode active material composite.

Preferably, mechanical energy is applied to the lithium silicate-based material and the carbon material by mechanical milling. This allows uniform application of mechanical energy to the lithium silicate-based material and the carbon material. Although a mechanical milling method is not particularly limited, a preferred method is ball milling comprising placing a sample in a container together with hard balls and then moving the container by external force, thereby applying mechanical energy. A ball mill to be used can be either of a planetary type in which energy is applied to a sample by rotation and revolution, or of a vibration type in which energy is applied to a sample by vibration in a horizontal direction, a vertical direction, etc.

Preferably, energy is applied by rotating the lithium silicate-based material and the carbon material at a relatively high speed in a ball mill. When a mechanical ball mill (Planetary Ball Mill P-7 series, produced by Fritsch Japan Co., Ltd.) is employed, preferably milling speed is controlled by setting the number of rotations of the ball mill in a range of from 100 to 1,000 rpm, for instance. Preferably milling time is controlled within a range of from 1 minute to 20 hours. Preferably, the milling time is 1 hour or more.

Although it also depends on milling time, irreversible capacity of a positive electrode tends to be relatively large when the number of rotations of the ball mill is, for example, less than 700 rpm and relatively small when the number of rotations of the ball mill is, for example, 700 rpm or more, as will described in examples mentioned later. When the number of rotations of the ball mill is 700 rpm or more, the lithium silicate-based material and the carbon material are intricately composited. At this time, the lithium silicate-based material and the carbon material are mixed to adhere to each other in the form of fine particles on a nanolevel with an average particle size of 100 nm or less. The positive electrode active material composite can have a specific surface area of 150 m²/g or more, or even 170 m²/g or more. Moreover, the positive electrode active material composite can be secondary particles having an average particle size of not less than 0.7 μm and not more than 20 μm formed by adhesion of the lithium silicate-based material and the carbon material. Furthermore, the positive electrode active material composite can be relatively large secondary particles having an average particle size of not less than 1 μm and not more than 10 μm. In this case, preferably, fine surface particles are attached to particle surfaces of the positive electrode active material composite. Preferably, the surface particles have an average particle size of not less than 20 nm and not more than 100 nm, and desirably not less than 30 nm and not more than 90 nm, or not less than 35 nm and not more than 75 nm. The surface particles may contain part of a raw material of the lithium silicate-based material, for instance. Presence of the surface particles on the positive electrode active material composite promotes reactions of storing and releasing lithium ions.

In the positive electrode active material composite in such a state, Li and other elements are intermingled with each other in Li sites and sites of other elements. Therefore, Li ions are readily stored and released. Accordingly, irreversible capacity of the positive electrode is relative small. For example, A/C can be less than 0.1, where C is reversible capacity of the positive electrode and A is irreversible capacity of the positive electrode.

It should be noted that the average particle size of each kind of particles of the two materials is a value calculated from actual measurements of maximum size (maximum distance between two parallel lines sandwiching each particle) of a plurality of particles of each kind of particles obtained by analyzing a transmission electron microscope (TEM) image of the positive electrode active material composite.

On the other hand, when the number of rotations of the ball mill is less than 700 rpm, the lithium silicate-based material and the carbon material are loosely composited. At this time, these two materials with a relatively large particle size of 100 nm or more are mixed with each other. Moreover, the positive electrode active material composite can have a specific surface area of less than 150 m²/g. Li is located in Li sites of crystal and other elements (e.g., Fe, Mn) are located in sites of other elements, so the respective sites exhibit their own originality. As a result, irreversible capacity of the positive electrode is relatively large. For example, A/C can be 0.1 or more, where C is initial discharge capacity (reversible capacity) of the positive electrode and A is irreversible capacity of the positive electrode.

Moreover, although it also depends on milling speed, irreversible capacity is relatively small and A/C can be less than 0.1 when milling time is 3 hours or more, for instance. When milling time is less than 3 hours, the irreversible capacity is relatively large and A/C can be 0.1 or more.

Furthermore, initial charge capacity of the positive electrode increases with an increase in milling speed or milling time. This is because Li and other elements are intermingled with each other in sites of Li and in sites of other elements in the crystal structure of the lithium silicate-based material and Li is easily movable. Reversible capacity and irreversible capacity also increase with an increase in initial charge capacity.

It should be noted that in applying energy, preferably, the lithium silicate-based material and the carbon material are mixed in an atmosphere of inert gas (e.g., argon gas and nitrogen gas) or in an air atmosphere.

Thus, the irreversible capacity of the positive electrode can be adjusted by changing milling conditions of the lithium silicate-based material and the carbon material.

After applying energy, preferably, heat treatment is applied to a mixture of the lithium silicate-based material and the carbon material which have been applied with mechanical energy. In the heat treatment, a mixture of an active material and an electrically conductive material are heated at a predetermined temperature. The heat treatment causes recrystallization and sintering of the active material, so particles come in close contact with each other. Thus, electric conductivity improves.

Preferred heat treatment temperature is 500 to 800 deg. C. Too low heat treatment temperature is not preferred because it is difficult to precipitate carbon uniformly around the lithium silicate-based material. On the other hand, too high heat treatment temperature is not preferred, either, because the lithium silicate-based material may decompose or lose lithium, and this results in a decrease in charge and discharge capacity. Generally, heat treatment time can be set to 1 to 10 hours.

Preferably, the heat treatment is applied in a reducing atmosphere in order to keep transitional metal ions contained in the lithium silicate-based material divalent. Preferably, the reducing atmosphere in this case is a mixed gas atmosphere comprising carbon dioxide and a reducing gas in order to suppress divalent transitional metal ions from being reduced to simple metal just like the reducing atmosphere of a synthetic reaction of the lithium silicate-based material in molten salt. A mixing ratio of carbon dioxide and the reducing gas can be the same as that of the atmosphere of the synthetic reaction of the lithium silicate-based material.

(2) Composition of Negative Electrode Active Material and Adjustment of Irreversible Capacity A negative electrode includes a negative electrode active material. The negative electrode active material contains silicon (Si). A ratio of irreversible capacity to reversible capacity of the negative electrode can be adjusted by changing a silicon content in the negative electrode active material. For example, preferably, the negative electrode active material comprises at least one of Si and $SiO_x$ (xO).

Si comprises silicon (Si). $SiO_x$ can be entirely constituted by $SiO_2$, and can partially contain Si phase. Preferably, $SiO_x$ comprises $SiO_2$ phase and Si phase and x satisfies $0.5 \leq x \leq 1.5$.

Preferably, the negative electrode active material comprises at least one of Si and $SiO_x$, and $SiO_x$ powder has an overall composition expressed by a formula: $SiO_x$ ($0.5 \leq x \leq 1.5$) and comprises Si phase and $SiO_2$ phase.

Silicon (Si) contributes to battery reaction and silicon oxide ($SiO_2$) has a great effect on irreversible capacity. Irreversible capacity of the negative electrode increases with a greater ratio of the silicon oxide in the negative electrode active material. The reason is supposed to be as follows. Silicon oxide causes the following reaction in electric charge.

$$Li + SiO \rightarrow SiLi_{4.4} + Li_4SiO_4 \quad (1)$$

$Li_4SiO_4$ generated in the formula (1) is an irreversible component and is not used in the following reactions. In the following charge and discharge cycles, a reaction is repeated between Si and $SiLi_{4.4}$ by alternately changing the direction of the reaction (Electrochemistry, 80(6), 405-408 (2012)). Therefore, silicon oxide ($SiO_2$) has a great effect on irreversible capacity of the negative electrode. The irreversible capacity of the negative electrode increases with a larger ratio of silicon oxide, and the irreversible capacity of the negative electrode decreases with a smaller ratio of silicon oxide.

Hence, as a Si content is increased in a sum of Si and $SiO_x$, reversible capacity increases and irreversible capacity decreases. As a $SiO_x$ content is increased, reversible capacity decreases and irreversible capacity increases.

When the negative electrode active material synthesized from Si powder, for instance, a ratio of irreversible capacity B to reversible capacity D of the negative electrode active material (B/D) sometimes satisfies $0.5 < B/D < 0.7$. In this case, preferably, a ratio of irreversible capacity A to reversible capacity C of the positive electrode (A/C) also satisfies $0.5 < A/C < 0.7$. When the positive electrode has this ratio, for example, the lithium silicate-based material of the positive electrode active material composite has an average particle size of not less than 10 nm and not more than 10 μm, and the carbon material of the positive electrode active material composite has an average particle size of not less than 10 nm and not more than 1 μm.

Preferably, the negative electrode active material is synthesized from Si powder and the lithium silicate-based material of the positive electrode active material has an average particle size of not less than 10 nm and not more than 10 μm, and the carbon material of the positive electrode active material has an average particle size of not less than 10 nm and not more than 1 μm.

When the negative electrode active material is synthesized from $SiO_x$ powder, a ratio of irreversible capacity B to reversible capacity D of the negative electrode active material (B/D) sometimes satisfies $0.3 < B/D < 0.5$. In this case, preferably, a ratio of irreversible capacity A to reversible capacity C of the positive electrode (A/C) also satisfies $0.3 < A/C < 0.5$. When the positive electrode has this ratio, for example, the lithium silicate-based material of the positive electrode active material composite has an average particle size of not less than 10 nm and not more than 20 μm and the carbon material of the positive electrode active material composite has an average particle size of not less than 10 nm and not more than 1 μm.

Preferably, the negative electrode active material is synthesized from $SiO_x$ powder, and the lithium silicate-based material of the positive electrode active material has an average particle size of not less than 10 nm and not more than 20 μm and the carbon material of the positive electrode active material has an average particle size of not less than 10 nm and not more than 1 μm.

In order to adjust irreversible capacity and reversible capacity of the negative electrode by controlling irreversible capacity of the abovementioned negative electrode active material, preferably, the amount of the positive electrode active material composite applied to a positive electrode current collector, and the amount of the negative electrode active material applied to a negative electrode current collector are set to predetermined amounts. This is because a change in the amount of the positive electrode active material applied to the positive electrode current collector and a change in the amount of the negative electrode active material applied to the negative electrode current collector may cause a change in irreversible capacity and reversible capacity of the negative electrode.

(3) Production of Lithium Silicate-Based Material

The positive electrode active material composite is formed by compositing the lithium silicate-based material and the carbon material. The lithium silicate-based material to be composited with the carbon material can be formed, for example, by molten salt synthesis, solid-phase synthesis, hydrothermal synthesis, and so on. Particularly, molten salt synthesis is preferred.

Molten salt synthesis is a method for synthesizing the lithium silicate-based material in molten salt including alkali metal salt. Examples of the alkali metal salt used in the molten salt synthesis include one selected from the group consisting of lithium salt, potassium salt, sodium salt, rubidium salt, and cesium salt. Of these salts, lithium salt is most desired. When molten salt including lithium salt is used, a lithium silicate-based material in which impurity phase is rarely formed and lithium atoms are excessively contained is easily formed. The lithium silicate-based material thus obtained can be used as a positive electrode material for a lithium-ion battery having good cycle characteristics and high capacity.

Moreover, desirably, the alkali metal salt used in molten salt synthesis contains at least one of alkali metal chlorides, alkali metal carbonates, alkali metal nitrides, and alkali metal hydroxides. Specific examples include lithium chloride (LiCl), potassium chloride (KCl), rubidium chloride (RbCl), cesium chloride (CsCl), lithium carbonate ($Li_2CO_3$), potassium carbonate ($K_2CO_3$), sodium carbonate ($Na_2CO_3$), rubidium carbonate ($Rb_2CO_3$), cesium carbonate ($Cs_2CO_3$), lithium nitrate ($LiNO_3$), potassium nitrate ($KNO_3$), sodium nitrate ($NaNO_3$), rubidium nitrate ($RbNO_3$), cesium nitrate ($CsNO_3$), lithium hydroxide (LiOH), potassium hydroxide (KOH), sodium hydroxide (NaOH), rubidium hydroxide (RbOH), and cesium hydroxide (CsOH). One of these examples can be singly used, and two or more of these examples can be used in mixture.

Preferably, the alkali metal salt is alkali metal carbonate, and more preferably contains lithium carbonate. Desirably, the alkali metal salt is a carbonate mixture comprising at least one alkali metal carbonate selected from the group consisting of potassium carbonate, sodium carbonate, rubidium carbonate and cesium carbonate; and lithium carbonate. Owing to mixing two or more carbonates, melting temperature of molten salt can be lowered, so synthetic reaction can be carried out at a low temperature of from 400 to 650 deg. C.

Moreover, upon performing the reaction at the relatively low temperature of from 400 to 650 deg. C. in a molten salt of the mixture, crystal grains are suppressed from growing and fine particles with an average particle size of 50 nm to 10 μm are obtained, and furthermore, the amount of impurity phase greatly decreases. As a result, the lithium silicate-based material thus obtained can be used as a positive electrode active material of a nonaqueous electrolyte secondary battery having good cycle characteristics and high capacity.

Furthermore, preferably, a lithium silicate compound expressed by $Li_2SiO_3$ and a material containing the at least one metal element selected from the group consisting of iron and manganese are reacted with each other in a molten salt of a carbonate mixture comprising at least one alkali metal carbonate selected from the group consisting of potassium carbonate, sodium carbonate, rubidium carbonate and cesium carbonate; and lithium carbonate at 400 to 650 deg. C.

A specific reaction method is not particularly limited, but may comprise, for example, mixing the abovementioned carbonate mixture, the lithium silicate compound, and the material containing the metal element (corresponding to $M^1$ in the compositional formula; the same shall apply hereinafter) and uniformly mixing this mixture by using a ball mill, etc., and then heating the mixture to melt the carbonate mixture. Thus, a reaction proceeds between the lithium silicate compound and the aforementioned metal element in the molten carbonate, thereby yielding a lithium silicate-based material.

In this case, a mixing ratio of a raw material comprising the lithium silicate compound and the aforementioned material containing the metal element, and the carbonate mixture is not particularly limited, and only need to allow uniform dispersion of the raw material in a molten salt of the carbonate mixture. For example, the total amount of the molten salt raw material is preferably within a range of from 20 to 300 parts by mass, or more preferably within a range of from 50 to 200 parts by mass or from 60 to 80 parts by mass, with respect to 100 parts of the total mass of the carbonate mixture.

The abovementioned reaction is performed in a mixed gas atmosphere containing carbon dioxide and a reducing gas, in order to allow the abovementioned metal element to be stably present as divalent ions during the reaction. In this atmosphere, the abovementioned metal element can be stably kept as divalent ions. As to a ratio of the reducing gas to carbon dioxide, for example, the reducing gas can be 0.01 to 0.5 mol or preferably 0.03 to 0.4 mol with respect to 1 mol of carbon dioxide. Examples of the reducing gas include hydrogen and carbon monoxide, and hydrogen is particularly preferred.

Pressure of the mixed gas of carbon dioxide and the reducing gas is not particularly limited, and normally set to atmospheric pressure, but can be increased pressure or reduced pressure.

Reaction time of the lithium silicate compound and the abovementioned material containing the metal element is generally 0.1 to 30 hours and preferably 5 to 25 hours.

When the abovementioned reaction is over, the alkali metal carbonate used as flux is removed, thereby obtaining a lithium silicate-based material as a target.

For the removal of the alkali metal carbonate, the alkali metal carbonate can be dissolved and removed by washing the product with a solvent capable of dissolving the alkali metal carbonate. For example, water can be used as a solvent, but use of a nonaqueous solvent such as alcohol and acetone is preferred in order to prevent oxidation of transitional metal contained in the lithium silicate-based material. It is particularly preferred to use acetic anhydride and acetic acid at a mass ratio of 2:1 to 1:1. This mixed solvent is not only good in dissolving and removing the alkali metal carbonate. When acetic acid reacts with the alkali metal carbonate to yield water, acetic anhydride takes in water and yields acetic acid and thereby this mixed solvent can suppress water separation. When acetic anhydride and acetic acid are used, preferably, first acetic anhydride is mixed with the product and the mixture is ground in a mortar or the like to refine particles, and then acetic acid is added to the particles coated with acetic anhydride. According to this method, water yielded by a reaction of acetic acid and alkali metal carbonate rapidly reacts with acetic anhydride, and this reduces an opportunity of contact between the product and water. Therefore, the target material can be effectively suppressed from being oxidized or decomposed.

(4) Production of $SiO_x$ Powder

The negative electrode active material sometimes contains $SiO_x$ powder. In producing this $SiO_x$ powder, preferably, raw material power containing silicon monoxide is used as a raw material of the $SiO_x$ powder. In this case, silicon monoxide in the raw material powder undergoes disproportionation reaction into two phases of $SiO_2$ phase and Si phase. In the disproportionation of silicon monoxide, silicon monoxide ($SiO_n$, where $0.5 \leq n \leq 1.5$), which is homogeneous solid with an atomic ratio of Si to O of roughly 1:1, is separated into two phases of $SiO_2$ phase and Si phase due to reaction inside the solid. Silicon oxide powder obtained by the disproportionation contains $SiO_2$ phase and Si phase.

Disproportionation of silicon monoxide of the raw material proceeds by applying energy to the raw material. Examples of the method of applying energy include heating the raw material and milling the raw material.

When the raw material is heated, it is generally said that almost all silicon monoxide undergoes disproportionation reaction to separate into two phases at 800 deg. C. or more in an oxygen-free atmosphere. Specifically, silicon oxide power having two phases of amorphous $SiO_2$ phase and crystal Si phase can be obtained by applying heat treatment to raw material powder containing amorphous silicon monoxide powder at 800 to 1200 deg. C. for 1 to 5 hours in an inert atmosphere such as in vacuum and in inert gas.

When the raw material is milled, part of mechanical energy of the milling contributes to chemical atom diffusion at a solid phase boundary of the raw material, thereby generating oxide phase, silicon phase and so on. In milling, preferably the raw material powder is mixed by a V-type mixer, a ball mill, an attritor, a jet mill, a vibration mill, a high-energy ball mill, etc. in an inert gas atmosphere such as in vacuum and in argon gas. Disproportionation of silicon monoxide can be further promoted by applying heat treatment to the raw material powder after milled.

(5) Structure of Lithium-Ion Secondary Battery

The lithium-ion secondary battery comprises a positive electrode including a positive electrode active material composite, a negative electrode including a negative electrode active material, an electrolyte, and a separator if necessary.

Preferably, the positive electrode comprises the abovementioned positive electrode active material composite and a current collector. The positive electrode can have a similar structure to that of a common positive electrode for a nonaqueous electrolyte secondary battery.

For example, the positive electrode can be produced by adding a conductive agent and/or a binder to the aforementioned positive electrode active material composite, if necessary, and forming a paste of the mixture with a solvent and applying the paste on the current collector. Examples of the conductive agent include acetylene black (AB), Ketjenblack (KB), and vapor grown carbon fiber (VGCF). Examples of the binder include polyvinylidene difluoride (PVDF), polytetrafluoroethylene (PTFE), and stylene-butadiene rubber (SBR).

The amount of the conductive agent used is not particularly limited, but can be 5 to 20 parts by mass, for instance, with respect to 100 parts by mass of the positive electrode active material composite. The amount of the binder used is not particularly limited, but can be 5 to 20 parts by mass, for instance, with respect to 100 parts by mass of the positive electrode active material composite. Moreover, the positive electrode can also be produced by kneading a mixture of the positive electrode active material composite, the abovementioned conductive agent and the binder by using a mortar or a press machine and making a film of the mixture, and then pressure bonding the film to the current collector by a press machine.

The material of the current collector is not particularly limited and can be any conventional material used for positive electrodes of nonaqueous electrolyte secondary batteries, such as aluminum foil, aluminum mesh, stainless steel mesh, copper foil, and copper mesh. Carbon unwoven cloth, carbon woven cloth, etc. can also be used as the current collector.

Although shape and thickness of the positive electrode are not particularly limited, the thickness is preferably set to 10 to 200 μm or more preferably to 20 to 100 μm, for instance, by applying the active material and then compressing the current collector applied with the active material. Therefore, the amount of the active material to be applied can be suitably determined in accordance with the type and structure of the current collector used so that the positive electrode has the above thickness after compression.

The negative electrode comprises at least a negative electrode active material. Generally, the negative electrode comprises a negative electrode active material and a current collector. The negative electrode active material constitutes a negative electrode material together with a binder and/or a conductive agent, if necessary. Preferably, the negative electrode material is formed into paste by adding a solvent and applied to a surface of the current collector. Copper foil or copper mesh is used as a current collector. The binder and the conductive agent can be the same as those of the positive electrode.

Preferably used as an electrolyte is a known solution in which lithium salt such as lithium perchlorate, $LiPF_6$, $LiBF_4$, and $LiCF_3SO_3$ is dissolved in a nonaqueous solvent such as ethylene carbonate, diethyl carbonate, propylene carbonate and dimethyl carbonate at a concentration of 0.5 to 1.7 mol/L. In addition, other known components of a battery can be employed.

Preferably used as a separator is a microporous film or unwoven cloth of polyolefin such as polypropylene, polyethylene, and a copolymer of propylene and ethylene.

The aforementioned lithium-ion secondary battery can be mounted on a vehicle, a personal computer, portable communication device, etc.

EXAMPLES

Production of Active Material Composite

Positive electrode active materials of Samples 1 to 7 were produced by the following method.

Sample 1

First, 20 mL of acetone was added to a mixture of 0.03 mol of iron (produced by Kojundo Chemical Lab. Co., Ltd., purity of 99.9%) and 0.03 mol of a lithium silicate-based material $Li_2SiO_3$ (produced by Kishida Chemical Co., Ltd., purity of 99.5%). The resulting mixture was mixed in a zirconia ball mill at 500 rpm for 60 minutes and then dried. Then, the dried material was mixed with a carbonate mixture. The carbonate mixture was prepared by mixing lithium carbonate (produced by Kishida Chemical Co., Ltd., purity of 99.9%), sodium carbonate (produced by Kishida Chemical Co., Ltd., purity of 99.5%) and potassium carbonate (produced by Kishida Chemical Co., Ltd., purity of 99.5%) at a molar ratio of 0.435 mol:0.315 mol:0.25 mol. The mixing ratio was 90 parts by mass of the carbonate mixture with respect to 100 parts of the total mass of iron and the lithium silicate-based material.

Then, 20 mL of acetone was added to the abovementioned mixture, and the resulting mixture was mixed in a zirconia ball mill at 500 rpm for 60 minutes and dried. Then obtained particles were put in a gold crucible and heated at 500 deg. C. in an electric furnace in a mixed gas atmosphere of carbon dioxide (flow rate: 100 ml/L) and hydrogen (flow rate: 3 ml/L), to undergo a reaction for 13 hours while keeping the carbonate mixture molten.

When temperature of the molten salt dropped to 400 deg. C. after the reaction was over, a whole reactor core constituting a reaction system was removed from the electric furnace and rapidly cooled to room temperature with the mixed gas supplied thereto.

Next, 20 mL of water was added to the obtained product, and the mixture was ground in a mortar and then repeatedly washed and filtered with water, thereby obtaining salt-removed powder. The powder was put in a drier and dried at 100 deg. C. for about 1 hour, thereby obtaining lithium iron silicate.

A crystal structure analysis by powder X-ray diffraction (XRD) showed that the obtained dried powder was $Li_2FeSiO_4$ in a monoclinic crystal system with space group $P2_1/n$. The $Li_2FeSiO_4$ had an average particle size of 0.5 μm. The obtained $Li_2FeSiO_4$ was labeled as Sample 1.

Sample 2

$Li_2FeSiO_4$, and acetylene black (AB, average particle size of 0.3 μm) as a carbon material were mixed at a mass ratio of $Li_2FeSiO_4$:AB=5:4. The mixture was manually stirred in a mortar for 30 minutes. Then, heat treatment was applied to the mixture. Heat treatment conditions were 700 deg. C., 2 hours, and an atmosphere of $CO_2/H_2$=100/3 ccm. XRD pattern of the composite was identified to be the same as that of $Li_2FeSiO_4$ immediately after synthesized. This was labeled as Sample 2.

Samples 3 to 7

Moreover, $Li_2FeSiO_4$ and AB were mixed at a mass ratio of $Li_2FeSiO_4$:AB=5:4. Ball milling of the mixture was performed by using a mechanical milling device (Planetary Ball Mill P-7, produced by Fritsch Japan Co., Ltd.) in an air atmosphere under the following predetermined conditions. This step was conducted by placing zirconia balls (50 g) with a diameter of 4 mm and the mixture (300 mg) in a grinding container for ball milling formed of zirconia and having an inner volume of 45 cc.

When the number of rotations of the ball mill was 200 rpm and rotation time was 5 hours, obtained active material composite was labeled as Sample 3. When the number of rotations of the ball mill was 450 rpm and rotation time was 5 hours, obtained active material composite was labeled as Sample 4. When the number of rotations of the ball mill was 700 rpm and rotation time was 5 hours, obtained active material composite was labeled as Sample 5. When the number of rotations of the ball mill was 800 rpm and rotation time was 5 hours, obtained active material composite was labeled as Sample 6. When the number of rotations of the ball mill was 800 rpm and rotation time was 2 hours, obtained active material composite was labeled as Sample 7.

Heat treatment was applied to Samples 3 to 7. Heat treatment conditions were 700 deg. C., 2 hours, an atmosphere of $CO_2/H_2$=100/3 ccm. XRD patterns of these composites were identified to be the same as the XRD pattern of $Li_2FeSiO_4$ immediately after synthesized.

SEM Observation

Images of Samples 1 to 6 were taken by a scanning electron microscope (SEM). The SEM images of Samples 1, 2, 3, 4, 5 and 6 are shown in FIGS. 4, 5, 6, 7, 8 and 9, respectively in this order. Images of cross-sections of Samples 4 and 6 were taken by the SEM and are shown in FIGS. 10 and 11, respectively.

In Sample 1, lithium silicate-based particles (white or gray portions) comprising $Li_2FeSiO_4$ having an average particle size of 1,000 nm were observed as shown in FIG. 4.

In Sample 2, lithium silicate-based particles (white particle portions) having an average particle size of 1,000 nm and carbon particles (fluffy light gray portions) having an average particle size of 100 nm were mixed as shown in FIG. 5. The respective particles had the same shape and size as those of the particles before mixing and did not aggregate together.

In Sample 3, lithium silicate-based particles and carbon particles having smaller particle sizes than those before mixing were composited as shown in FIG. 6. The lithium silicate-based particles and the carbon particles were mixed in the form of primary particles, and did not form secondary particles. A BET specific surface area analysis showed that this composite had a specific surface area of 59.3 m²/g.

In Sample 4, lithium silicate-based particles (gray portions) and carbon particles (black portions) having larger sizes than those of Sample 1 were mixed as shown in FIG. 7. The lithium silicate-based particles had an average particle size of 500 nm and the carbon particles had an average particle size of 100 nm. The lithium silicate-based particles and the carbon particles loosely aggregated and formed a composite. The composite had an average particle size of about 1 μm, which was smaller than that of the secondary particles of Sample 1. The composite had inner cavities. As shown in FIG. 10, in the secondary particles, the lithium silicate-based particles and the carbon particles had variations in size and were randomly dispersed. A BET specific surface area analysis showed that this composite had a specific surface area of 106 m$^2$/g.

In Sample 5, lithium silicate-based particles and carbon particles loosely aggregated and formed a composite, as shown in FIG. 8. Some inner cavities were left in the composite and these two kinds of particles had variations in size. Therefore, it cannot be said that the lithium silicate-based particles and the carbon particles adhered together while they were finely dispersed. A BET specific surface area analysis showed that this composite had a specific surface area of 130.7 m$^2$/g.

In sample 6, relatively large particles having a major axis of about 20 μm and fine particles having a particle size of about 1 to 4 μm were mixed, as shown in FIG. 9. As shown in FIG. 11, a large number of fine particles were uniformly dispersed inside the relatively large particles. That is to say, the relatively large particles were secondary particles formed by compositing fine primary particles. A BET specific surface area analysis showed that this composite had a high specific surface area of 171.7 m$^2$/g. Each particle of the active material composite had a core portion and a surface layer covering a surface of the core portion. In the core portion, lithium silicate-based particles comprising Li$_2$FeSiO$_4$ and having an average particle size of 10 to 30 nm were uniformly dispersed in a matrix comprising carbon. The surface layer had a thickness of about 1 μm and comprised a C—O-rich layer.

Production and Evaluation of Lithium-Ion Secondary Battery

Half cells were produced by using the positive electrode active materials of Samples 3 to 7 and subjected to a charge and discharge test as follows.

The positive electrode active material of each of Samples 3 to 7, acetylene black (AB), and polytetrafluoroethylene (PTFE) were mixed at a mass ratio of the positive electrode active material:AB:PTFE=17:5:1. The mixture was kneaded and then formed in a sheet shape and then bonded by compression to a current collector formed of aluminum, thereby producing an electrode. After vacuum dried at 140 deg. C. for 3 hours, the electrode was used as a positive electrode. Then, a coin battery of each of Samples 3 to 7 was assembled by using a solution of 1 mol/L of LiPF$_6$ in a mixture of ethylene carbonate (EC):dimethyl carbonate (DMC)=3:7 as an electrolyte, a polypropylene film (Celgard 2400 produced by Celgard) as a separator, and lithium metal foil as a negative electrode in addition to the positive electrode of each of Samples 3 to 7.

Charge and Discharge Test

These coin batteries were subjected to a charge and discharge test at 30 deg. C. Test conditions were a current density of 0.05 mA/cm$^2$ and a voltage of 1.5 to 4.5 V (except a constant voltage of 4.8 V for 10 hours for initial charge). Charge and discharge curves of the half cells produced by using the positive electrode active materials of Samples 3, 4, 5, 6, and 7 are shown in FIGS. 12, 13, 14, 15 and 16, respectively. Initial charge capacity, initial discharge capacity, irreversible capacity, a ratio of irreversible capacity to initial discharge capacity (reversible capacity) are shown in Table 1.

TABLE 1

| | MIXING CONDITION | LITHIUM SILICATE PARTICLES nm | CARBON PARTICLES nm | COMPOSITE μm | SPECIFIC SURFACE AREA m$^2$/g | INITIAL CHARGE CAPACITY mAh/g | INITIAL DISCHARGE CAPACITY (REVERSIBLE CAPACITY C) mAh/g | IRREVERSIBLE CAPACITY A mAh/g | A/C |
|---|---|---|---|---|---|---|---|---|---|
| Sample 1 | | 1000 | — | — | NM | NM | NM | NM | — |
| Sample 2 | Manual Stirring, 0.5 h | 1000 | 100 | — | NM | NM | NM | NM | — |
| Sample 3 | 200 rpm, 5 h | 500 | 100 | — | 59.3 | 223 | 137 | 86 | 0.63 |
| Sample 4 | 450 rpm, 5 h | 500 | 100 | 1 | 106 | 211 | 178 | 33 | 0.19 |
| Sample 5 | 700 rpm, 5 h | 20-50 | 100 | 2 | 130.7 | 258 | 244 | 14 | 0.06 |
| Sample 6 | 800 rpm, 5 h | 10-30 | 10 | 20 | 171.7 | 304 | 300 | 4 | 0.01 |
| Sample 7 | 800 rpm, 2 h | NM | NM | NM | NM | 342 | 221 | 121 | 0.55 |

*NM stands for "Not Measured".

As shown in FIGS. 12 to 16 and Table 1, charge capacity and discharge capacity increased and irreversible capacity decreased with an increase in the number of rotations of the ball mill. The ratio of the irreversible capacity A to the reversible capacity C (initial discharge capacity) (A/C) also decreased with an increase in the number of rotations of the ball mill. The A/C increased with a shorter milling time.

Relation Between Irreversible Capacities of Positive Electrode and Negative Electrode and Actual Capacity of Secondary Battery Three kinds of lithium-ion secondary batteries shown in Batteries 1 to 3 were produced and actual capacity of these batteries was measured.

Battery 1

The positive electrode active material of Sample 7, acetylene black (AB) as a conductive agent and polyvinylidene difluoride (PVDF) as a binder were mixed and a solvent was added, thereby obtaining a paste-like positive electrode material. The solvent was N-methylpyrrolidone (NMP). A mass ratio of the positive electrode active material, AB, and PVDF in the positive electrode material was 90:5:5. The positive electrode material was bonded by compression to a current collector formed of aluminum, thereby producing an electrode. After vacuum dried at 140 deg. C. for 3 hours, the electrode was used as a positive electrode.

A half cell was assembled by using this electrode and lithium metal as an opposite electrode. Specifications of the half cell were the same as those of the abovementioned half cells assembled by using the samples, except for an electrolyte. The electrolyte of this half cell was prepared by adding 1 wt % of vinylene carbonate (VC) to a solution of 1 mol/L of $LiPF_6$ in a mixture of EC:DEC=1:1 (by volume ratio).

This half cell was subjected to a charge and discharge test. Test conditions were a voltage range of 4.8 to 1.5 V, a current density of 0.05 C rate, a temperature of 30 deg. C. Measured initial charge capacity and initial discharge capacity are shown in Table 2.

Next, a negative electrode was produced. Commercially available SiO powder was put in a ball mill and milled at the number of rotations of 450 rpm for 20 hours in an Ar atmosphere, and then subjected to heat treatment at a temperature of 900 deg. C. for 2 hours in an inert gas atmosphere. Owing to these treatments, the SiO powder underwent a disproportionation reaction to produce disproportionate $SiO_x$ powder. X-ray diffraction (XRD) analysis of this disproportionate powder by using CuKα showed characteristic peaks attributed to silicon (Si) as a simple substance and silicon dioxide ($SiO_2$). This indicates that the disproportionate $SiO_x$ powder included silicon as a simple substance and silicon dioxide ($SiO_2$).

The disproportionate $SiO_x$ powder, a conductive agent and polyimide (PI) as a binder were mixed and a solvent was added to produce a slurry mixture. The conductive agent used was acetylene black (AB). The solvent was NMP. A percent mass ratio of the disproportionate $SiO_x$ powder, the conductive agent and the binder was the disproportionate $SiO_x$ powder:the conductive agent:the binder=80:2:18.

Next, the slurry mixture was applied in a film shape to one side surface of copper foil as a current collector by using a doctor blade. The copper foil with the film was pressed under a predetermined pressure, and heated at 200 deg. C. for two hours and then cooled. Thus produced was a negative electrode comprising a negative electrode material (a negative electrode active material layer) fixed on the surface of the current collector.

A half cell was assembled by using this electrode and lithium metal as an opposite electrode. Specifications of this half cell were the same as those of the abovementioned half cells assembled by using the samples, except for an electrolyte. The electrolyte of this half cell was prepared by adding 1 wt. % of VC to a solution of 1 mol/L of $LiPF_6$ in a mixture of EC:DEC=1:1 (by volume ratio).

This half cell was subjected to a charge and discharge test. Test conditions were a voltage range of 0 to 1.0 V, a current density of 0.1 C rate, and a temperature of 30 deg. C. Measured initial charge capacity and initial discharge capacity are shown in Table 2.

Moreover, a lithium-ion secondary battery was assembled by using a positive electrode including the positive electrode active material composite comprising the produced Sample 7, and a negative electrode including a negative electrode active material comprising $SiO_x$ powder. An electrolyte of this battery was prepared by adding 1 wt. % of VC to a solution of 1 mol/L of $LiPF_6$ in a mixture of EC:DEC=1:1 (by volume ratio). Used as a separator was a propylene film (Celgard 2400 produced by Celgard).

This lithium-ion secondary battery was subjected to a charge and discharge test. Test conditions were a voltage range of 4.79 to 0.8 V, a current density of 0.05 C rate, and a temperature of 30 deg. C. Measured initial discharge capacity (actual capacity) and initial discharge capacity retention rate are shown in Table 2. The initial discharge capacity retention rate is a percent ratio of initial discharge capacity E of the battery to initial discharge capacity C of the positive electrode (E/C).

As shown in Table 2, a ratio of irreversible capacity B of the negative electrode to irreversible capacity A of the positive electrode (B/A) was 2.08, a ratio of initial discharge capacity (reversible capacity) D of the negative electrode to initial discharge capacity (reversible capacity) C of the positive electrode (D/C) was 0.76, and initial discharge capacity retention rate of the battery was 42%. It was found that 58% of the initial discharge capacity C of the positive electrode was not used.

Battery 2

A positive electrode of Battery 2 was the same as that of Battery 1. A negative electrode of Battery 2 was the same as that of Battery 1, except that silicon (Si) powder was used instead of the disproportionate $SiO_x$ powder of Battery 1. A half cell using the positive electrode of Battery 2, a half cell using the negative electrode of Battery 2, and the abovementioned Battery 2 were subjected to a charge and discharge test in a similar way to those of Battery 1, and test results are shown in Table 2.

As shown in Table 2, a ratio of irreversible capacity B of the negative electrode to irreversible capacity A of the positive electrode (B/A) was 1.16, a ratio of initial discharge capacity (reversible capacity) D of the negative electrode to initial discharge capacity (reversible capacity) C of the positive electrode (D/C) was 1.05, and initial discharge capacity retention rate of the battery was 72%. It was found that 28% of the initial discharge capacity C of the positive electrode was not used.

Battery 3

A positive electrode and a negative electrode of Battery 3 had the same components as those of the positive electrode and the negative electrode of Battery 2, but were different from those of Battery 2 in that the amount of the components applied to the current collectors was reduced. A half cell using the positive electrode of Battery 3 a half cell using the negative electrode of Battery 3 and the abovementioned Battery 3 were subjected to a charge and discharge test in a similar way to those of Battery 1, and test results are shown in Table 2.

As shown in Table 2, a ratio of irreversible capacity B of the negative electrode to irreversible capacity A of the positive electrode (B/A) was 0.73, a ratio of initial discharge capacity (reversible capacity) D of the negative electrode to initial discharge capacity (reversible capacity) C of the positive electrode (D/C) was 0.66, and initial discharge capacity retention rate of the battery was 64%. It was found that almost 40% of the initial discharge capacity C of the positive electrode was not used.

Figure 17:
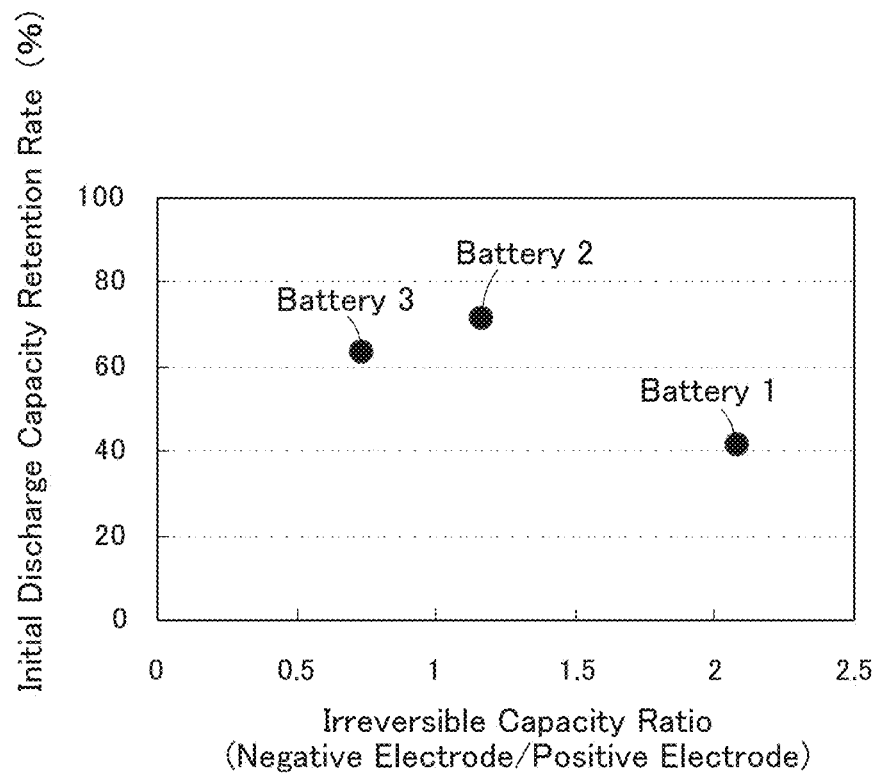
FIG. 17 is a graph showing a relation between a ratio of irreversible capacity B of a negative electrode to irreversible capacity A of a positive electrode (B/A), and initial discharge capacity retention rate of each of Batteries 1 to 3.

A relation between the ratio of the irreversible capacity B of the negative electrode to the irreversible capacity A of the positive electrode (B/A) of each of the batteries and the initial discharge capacity retention rate of each of the batteries is shown in FIG. 17. As B/A was closer to 1, the initial discharge capacity and the initial discharge capacity retention rate were higher.

TABLE 2

| | POSITIVE ELECTRODE | | | | NEGATIVE ELECTRODE | | | | | | BATTERY | |
|---|---|---|---|---|---|---|---|---|---|---|---|---|
| | INITIAL CAHRGE CAPAC- ITY mAh/cm² | INITIAL DIS- CHARGE CAPAC- ITY (REVERS- IBLE CAPAC- ITY C) mAh/cm² | IRRE- VERS- IBLE CAPAC- ITY A mAh/cm² | A/C | INITIAL CHARGE CAPAC- ITY mAh/cm² | INITIAL DIS- CHARGE CAPAC- ITY (REVERS- IBLE CAPAC- ITY D) mAh/cm² | IRRVERSIBLE CAPACITY B mAh/cm² | B/D | B/A | D/C | INITIAL CHARGE CAPAC- ITY mAh/cm² | INITIAL DIS- CHARGE CAPAC- ITY RETEN- TION RATE E/C % |
| BATTERY 1 | 2.34 | 1.72 | 0.62 | 0.36 | 2.59 | 1.30 | 1.29 | 0.99 | 2.08 | 0.76 | 0.72 | 42 |
| BATTERY 2 | 2.34 | 1.72 | 0.62 | 0.36 | 2.52 | 1.80 | 0.72 | 0.40 | 1.16 | 1.05 | 1.23 | 72 |
| BATTERY 3 | 1.46 | 0.94 | 0.52 | 0.55 | 1.01 | 0.62 | 0.38 | 0.61 | 0.73 | 0.66 | 0.60 | 64 |

The invention claimed is:

1. A lithium-ion secondary battery, comprising a positive electrode including a positive electrode active material composite formed by compositing a lithium silicate-based material and a carbon material, a negative electrode including a negative electrode active material containing a silicon, and an electrolyte, and
satisfying $0.8 < B/A < 1.2$, where A is irreversible capacity of the positive electrode and B is irreversible capacity of the negative electrode.

2. The lithium-ion secondary battery according to claim 1, satisfying $0.8 < D/C < 1.2$, where C is reversible capacity of the positive electrode and D is reversible capacity of the negative electrode.

3. The lithium-ion secondary battery according to claim 1, wherein the positive electrode active material composite is formed by compositing the lithium silicate-based material and the carbon material by mechanical milling of the lithium silicate-based material and the carbon material.

4. The lithium-ion secondary battery according to claim 3, wherein the irreversible capacity of the positive electrode is adjusted by controlling at least one of milling speed and milling time of the mechanical milling.

5. The lithium-ion secondary battery according to claim 1, wherein the lithium silicate-based material is expressed by a compositional formula $Li_{2+a-b}A_b M_{1-\beta} M'_\beta Si_{1+\alpha} O_{4+c}$, where A is at least one element selected from the group consisting of Na, K, Rb, and Cs, M is at least one element selected from the group consisting of Fe and Mn, and M' is at least one element selected from the group consisting of Mg, Ca, Co, Al, Ni, Nb, Ti, Cr, Cu, Zn, Zr, V, Mo and W, and the subscripts are as follows: $0 \leq \alpha \leq 0.2$, $0 \leq \beta \leq 0.5$, $0 \leq a < 1$, $0 \leq b < 0.2$, $0 < c < 0.3$.

6. The lithium-ion secondary battery according to claim 1, wherein the amount of the carbon material contained in the positive electrode active material composite is not less than 1% by mass and not more than 50% by mass of the total mass of the positive electrode active material composite.

7. The lithium-ion secondary battery according to claim 1, wherein
the negative electrode active material comprises at least one of Si and $SiO_x$, and
the $SiO_x$ has an overall composition expressed by a formula: $SiO_x$ ($0.5 \leq x \leq 1.5$) and comprises Si phase and $SiO_2$ phase.

8. The lithium-ion secondary battery according to claim 1, wherein the negative electrode active material is synthesized from Si powder and the lithium silicate-based material of the positive electrode active material has an average particle size of not less than 10 nm and not more than 10 μm, and the carbon material of the positive electrode active material has an average particle size of not less than 10 nm and not more than 1 μm.

9. The lithium-ion secondary battery according to claim 1, wherein the negative electrode active material is synthesized from $SiO_x$ powder and the lithium silicate-based material of the positive electrode active material has an average particle size of not less than 10 nm and not more than 20 μm, and the carbon material of the positive electrode active material has an average particle size of not less than 10 nm and not more than 1 μm.

10. A method for producing a lithium-ion secondary battery having a positive electrode including a positive electrode active material composite formed of compositing a lithium silicate-based material and a carbon material, a negative electrode including a negative electrode active material containing a silicon, and an electrolyte;
forming the positive electrode active material composite by compositing the lithium silicate-based material and the carbon material by mechanical milling of the lithium silicate-based material and the carbon material; and satisfying $0.8 < B/A < 1.2$, where A is irreversible capacity of the positive electrode and B is irreversible capacity of the negative electrode.

11. The method for producing a lithium-ion secondary battery according to claim 10, wherein the irreversible capacity of the positive electrode is adjusted by controlling at least one of milling speed and milling time of the mechanical milling.

* * * * *